United States Patent Office 3,537,014
Patented Oct. 27, 1970

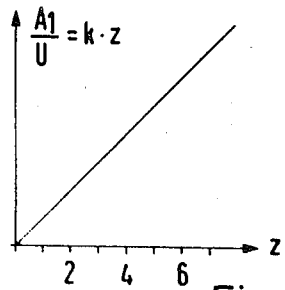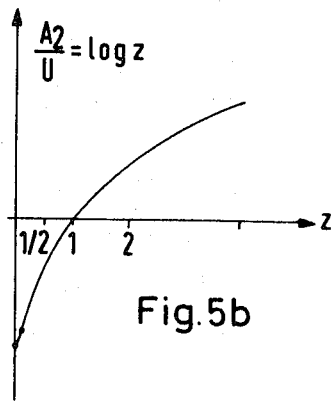
Fig.5a
Fig.5b
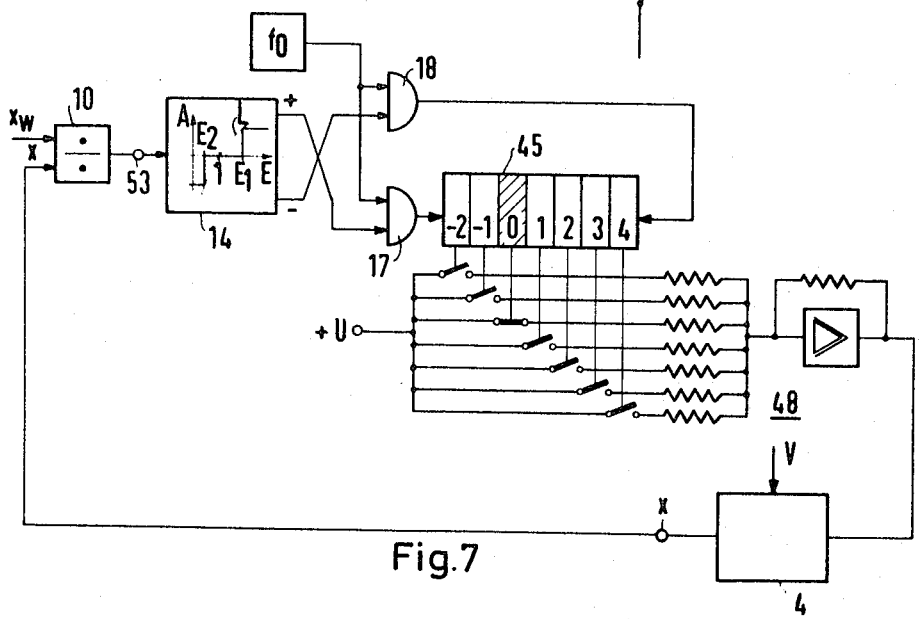
Fig.7
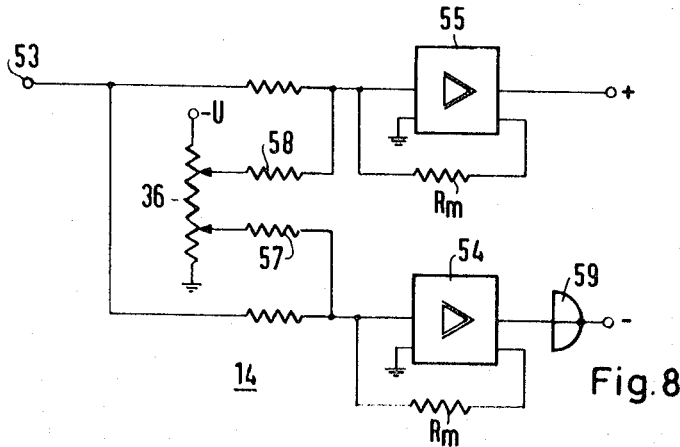
Fig.8

3,537,014
LOGARITHMIC ADAPTATION METHOD AND MEANS FOR REGULATING CLOSED-LOOP SYSTEMS
Winfried Speth, Erlangen, Germany, assignor to Siemens Aktiengesellschaft, a corporation of Germany
Filed June 18, 1968, Ser. No. 737,995
Claims priority, application Germany, June 19, 1967, S 110,373
Int. Cl. G06g 7/24
U.S. Cl. 328—145         16 Claims

ABSTRACT OF THE DISCLOSURE

In a closed-loop control system a substantially constant regulating amplification is maintained despite the occurrence of a disturbance of unknown or uncontrollable amplification in the regulated portion of the system, by imposing upon the regulating portion an exponential signal modulation ahead of the disturbance input member, seen in the signal flow direction, and by imposing a logarithmic demodulation upon the disturbance-affected signal behind the disutrbance member. Thus, the otherwise multiplicative influence of the disturbance upon the regulated portion of the loop system is converted to an additive effect which is negligible with respect to the dynamic amplifying gain. This permits optimizing the adjustment of the regulating system independently of the disturbance fluctuations.

---

My invention relates to methods and means for maintaining a substantially constant regulating amplification in closed-loop control systems which are subject to a multiplicatively acting disturbance of finite but unknown and/or variable amplification within the loop organization.

For describing the invention, it will be helpful to recall that a closed-loop control system, also called feedback control system, is composed of two component portions, namely a controlling or regulating system and a controlled or regulated system. The controlled or regulated system constitutes the forward path of the quantity being controlled. For example, if the controlled quantity is steam pressure, the regulated system includes the pressure supply and the pressure control valve from which it extends to the pressure output point at which the regulated steam pressure is to appear. The valve or other control member constitutes a branch point and responds to a command signal from the controlling or regulating system which includes a feedback from the output side of the regulated system to the branch point. The command signal varies the setting of the control member and thereby changes the quantity passing through the regulated system (forward path). At some point of the loop or at several points, or along a stretch of the loop, there may be introduced one or more disturbances, and these have a falsifying effect upon the control of the regulated system in which they become in effect amplified in the sense of a multiplication. That is, the control magnitude as well as any disturbance affecting the flow of the con trolled quantity in the regulated system are much smaller in intensity than the changes in the quantity thus subjected to control, this resulting in the amplifying effect just mentioned.

Relative to the terminology used in this specification and with respect to the servo-type of block diagrams shown in several illustrations of the accompanying drawings, reference may be had to the book "Feedback Control System" by Gille, Pelegrin and Decaulne, McGraw-Hill Book Co., New York, 1959, pages 7 to 22 and 771; and to a book "Analysis of Feedback Control Systems" by Bruns and Saunders, McGraw-Hill Book Co., New York, 1955, pages 1 to 6, 208 and 226.

It is customary and in most cases necessary to adjust the regulating system to the parameters of the regulated system (controlled forward path) in order to attain a best feasible dynamic transfer function of the loop organization. Depending upon whether one prefers minimizing the time of response, or securing best feasible reduction of hunting when correcting a regulating error, or achieving a reasonable compromise between these two requirements, various optimizing rules are available as to the proper adjustment of the regulating system, and all of these optimizing expedients take into account the occurrence of feedback-loop amplification as one of the most significant items. If, however, the loop amplification varies during operation, a regulating system initially optimalized can no longer provide the intended optimal regulating performance because it now becomes maladjusted to the changed parameters of the regulated system.

Regulating devices have become known in which a so-called controlled adaptation serves to maintain constant loop amplification so that the closed-loop organization remain optimalized in the event of changes in amplifying gain. The proper operation of such a controlled adaptation requires having advance knowledge of the type and magnitude of the changes in amplification or having the possibility of determining these changes by special measuring devices. With a number of regulated-system components, however, the ocurring amplification factor or gain is suprious; that is, the changes in amplification are not previously known, non-controllably variable and only measurable with difficulty if at all. Under such conditions the use of the controlled adaptation methods just mentioned is infeasible or impractical.

It is an object of my invention to provide a novel way of adaptive adjustment or regulation in a closed-loop control arrangement by means of which the fluctuations of the regulated-system (controlled forward path) amplification can be eliminated, or minimized down to a negligible reminder, without the necessity of knowing these changes in amplification or measuring them such as with the aid of test signals.

To achieve this object, my invention is predicated upon the concept that each change in regulated-system amplification can be traced back to the effect of a disturbance which acts at a given spot or within a given section of the regulated system and which operates to multiplicatively modify the constant product of the amplifying factors provided by the other components of the regulated system.

It is therefore another, more specific object of my invention to devise a method and means for maintaining a substantially constant regulated-system amplification in closed-loop organizations having one or more multiplicatively acting disturbance members of spurious, namely unknown and/or variable but finite amplification in the regulated system.

According to my invention, I subject in such a closed-loop (feedback) control system the signal or control command to exponential modulation at a locality ahead of the disturbance input, seen in the signal-flow direction, and I subject the disturbance-affected signal behind the disturbance input to logarithmic modulation.

According to this feature of my invention, therefore, the regulating command is first processed, at least partially, in the exponential range and thereafter is again processed in the logarithmic range. The disturbance, acting substantially in a multiplying sense upon the signal prior to the logarithmic modulation, is thus converted into an additive disturbance magnitude which becomes negligible with respect to the dynamic performance since the logarithm of a mathematical product is equal to the sum of the logarithms of the respective factors. By virtue of the invention, therefore, the effect of the disturbance is always in accordance with a defined constant dynamic amplifying factor or gain, irrespective of the extent of the multiplicative influence that would otherwise be encountered.

The invention will be further explained with reference to the accompanying drawings in which:

FIG. 1 is an explanatory diagram presented for the purpose of definition;

FIGS. 2a and 2b are diagrams for elucidating the basic performance of the exponential and logarithmic modulation in a system according to the invention;

FIGS. 3 and 4 are respective servo-type block diagrams of a feedback control system according to the invention;

FIGS. 5a and 5b are graphs relating to the operation of the modulator shown in FIG. 5;

FIG. 7 is a logic circuit diagram of a regulator system generally corresponding to the one represented by the block diagram of FIG. 4;

FIG. 8 is a circuit diagram of an amplifier which forms part of the circuit diagram shown in FIG. 7;

Figure 9:
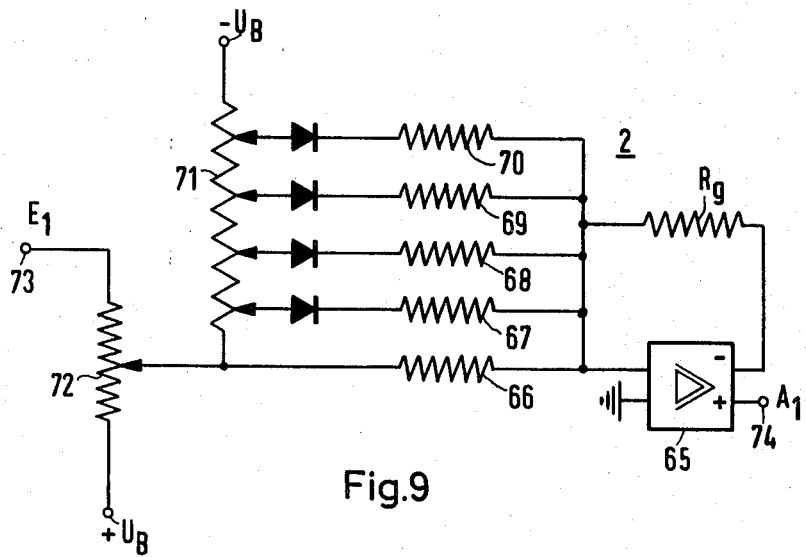
FIG. 9 is a circuit diagram of a function generator for exponential modulation of the signal, such a generator being applicable in a system as shown in FIG. 2a, 3 or 4.

The diagram of FIG. 1 relates to the general case of a regulated system which includes a disturbance member 1 acting upon the input signal $y$ multiplicatively in accordance with an unknown factor $V$ so that the output signal of the disturbance member 1 is in accordance with the equation $x = V \cdot y$. As regards time changes of the factor $V$, it is assumed only that these are slow in comparison with those of the input signal $y$, so that $V$ can be looked upon as being a constant with respect to the phenomena of interest to regulating dynamics.

Now assume that according to the invention and as shown in FIG. 2a, the disturbance member 1 receives the signal $y$ through an exponentially modulating member 2 whose input magnitude $E_1$ and output magnitude $A_1$ generally satisfy the relation $A_1 = a^{E_1}$. Also according to the invention and as shown in FIG. 2a, assume that a logarithmically modulating member 3 is connected behind the disturbance member 1 and has the general characteristic $A_2 = {}^b\!\log E_2$. The appertaining function is represented by a coordinate graph on each of the block symbols 2 and 3 in FIG. 2a. At the output of the modulating member 3 there appears the magnitude $x' = {}^b\!\log V \cdot a^y$ which, according to the rules of logarithmic computation, can be converted to the equation $x'_2 = y \cdot {}^b\!\log a + {}^b\!\log V$. A block diagram of this equation is represented in FIG. 2b. It will be recognized that the magnitude of the input signal $y$ is now influenced in a multiplying sense by a constant factor which has a given value determined by the freely selectable bases $a$ and $b$ of the respective exponential and logarithmic characteristics, and that there is added to the $y$-dependent output an influence stemming from the disturbance magnitude $V$. It is essential that in the portion of the regulated system that is modified in accordance with the invention, the previously factorial influence of the disturbance magnitude $V$ is changed to a merely additive effect. Hence the disturbance no longer appreciably modifies the dynamic amplifying gain. This amplifying gain otherwise exhibits a value which is constant independently of the magnitude $V$ and can be determined by the bases $a$ and $b$ of the step function characteristics. This constant amplification magnitude affords the possibility of fixedly setting the regulator parameters, for optimization; and the regulated circuit will then remain optimized regardless of fluctuations of the disturbance magnitude $V$.

In many cases the multiplicatively acting disturbance member is not separably incorporated in the regulated (forward-path) system of the closed-loop organization. It is therefore another object of my invention to provide for substantially constant amplification, and/or an optimizing adjustment of the regulated-system parameters, irrespective of any inseparability of the disturbance input member or locality from the controlled forward-path of the loop organization.

According to another feature of my invention, therefore, I apply a logarithmic modulation not only to the quantity being regulated but also modulate logarithmically and in the same manner the datum or reference value, used for comparison with the regulated quantity; and I then compare the logarithmically modulated datum reference with the logarithmically modulated quantity being regulated and supply the result of the comparison to the input of the regulator (regulating system). More specifically, according to a further feature of my invention, the difference between the respective logarithms of the datum quantity and the logarithm of the quantity being regulated, or the logarithm of the quotient of these two magnitudes, is supplied to the regulator and the control signal (command) impressed upon the regulated (forward-path) system is placed in exponential dependence upon the output magnitude of the regulator. In this manner, a regulation in the logarithmic range is performed. But this has no effect upon the result of the regulation because when the respective logarithms or the datum value and of the regulated value are equal, these values themselves are also equal.

The above-mentioned term "regulated quantity" is either the ultimate quantity itself, such as the pressure of the steam to be controlled or regulated in the example selected for illustration above. However, the "regulated quantity" may also be constituted by some other physical quantity, usually an electrical voltage, that varies in proportion to, or in some other definite dependence upon, the ultimate quantity to be regulated. For example, if the steam pressure in the above-mentioned example is measured electrically, a voltage varying in proportion to the actual steam pressure may constitute the "regulated value" in the meaning of the present specification; or if the speed of a vehicle is to be controlled or regulated, the speed-proportional voltage furnished from a tachometer generator may serve as the "regulated quantity." Because of the applicability of such secondarily variable quantities, the "regulated quantity" is often called "pilot" quantity or magnitude. The datum or reference quantity is indicative of the value at which the regulated or pilot quantity is to be maintained and is sometimes called "pattern" quantity, especially if it can be set to any chosen value, for example by adjusting a potentiometer.

The above-mentioned modulating members 2 and 3 may consist of known function generators. These are particularly simple if equipped with threshold diodes and resistors. Function generators of this type are described, for example, in the German periodical "Regelungstechnik," vol. 6, 1958, page 163, Fig. 19. Particularly simple in design are function generators formed essentially of an electronic modulation amplifier whose input or negative feedback circuit contains diodes of an at least approximately logarithmic characteristic. Particularly well suitable as such diodes are diffused silicon diodes which have recently become available with a strictly logarithmic voltage-current characteristic extending over more than two decades. The circuitry of such function generators will be described hereinafter with reference to FIGS. 9 and 10. Also applicable as modulators are digital devices, and since I prefer using them for the reasons mentioned presently, they will be described first, with reference to FIGS. 5 and 6.

An object of my invention, subsidiary to those already stated, is to devise a method and means for the adaptation of regulating systems that are called upon to meet particularly exacting requirements as to accuracy, reproducibility and long-time stability.

Generally, these qualities can be attained or approached by the use of digital components; and it is a more specific object of my invention to digitize the function generation and the double modulation on the above-elucidated principles by digital logic components and corresponding circuitry of relatively simple and reliable organization.

According to another feature of my invention, therefore, the modulation members in a regulating closed-loop system of the type described above, comprise a symmetrical three-point amplifier whose output signals act through a logic gate circuit upon a reversible stepper, such as a bidirectional counter or a reversibly operating stepping switch device, and thus supply the stepper with step-switching pulses. Connected to the output taps of the stepper there is a logarithmically or exponentially operating digital-analog converter and a linearly operating digital-analog converter; and the output magnitude of one of the digital-analog converters is feedback connected to the input of the three-point amplifier. The just-mentioned stepper may consist of a stepping mechanism or preferably of a solid-state shift register.

It is sometimes advantageous if such a logarithmically modulating member operating with digital components, will vary its output magnitude always in equal increments. According to another feature of my invention, therefore, I connect to the step outputs of a bidirectional binary counter a selector circuit for continuously determining the particular output which carries the highest-value signal at the time. This feature is predicated upon the concept that the logarithms of linearly increasing powers also exhibit a linear incremental increase. Such a selector circuit may be formed of OR gates which have one input connected to the individual counter-step outputs and which each have a second input to receive a signal from the output of the OR gate next adjacent in the direction of the higher counting weight, the outputs of each pair of mutually adjacent OR gates being connected with the inputs of antivalence circuits.

According to a further feature of my invention, the number of steps for the output magnitude of the logarithmically modulating member, for a given counting capacity of the binary counter, can be increased. To this end, mutually adjacent counter-step outputs are connected to the inputs of an AND gate whose outputs are connected with the inputs of OR gates additionally provided in the selective circuit.

Some regulating circuits make it preferable to employ a so-called discontinuous regulation in accordance with the known two-point (on-off) or three-point (plus-off-minus) regulation. The invention is also applicable to such discontinuous systems. For this purpose, and in accordance with a further feature of the invention, a divider device is impressed with the datum quantity and with the quantity to be regulated (or the corresponding pilot quantity). The output signal of the divider device is applied to a three-point flip-flop amplifier with output voltages of symmetrically different polarities for respective mutually reciprocal input voltages of the same polarity. An output voltage of the flip-flop amplifier is supplied to an integrating member which acts upon the regulated (forward-path) system through an exponentially acting modulating member. The integrating member just mentioned may be conntituted by an I-regulator (integral control system; see "Feedback Control Systems" by Gille, Pelegrin and Decaulne, 1959, page 772). The logarithmic function required for the purpose of the invention can thus be substituted by the characteristic of a three-point amplifier.

For purely electrically operating I-regulators, a particularly simple embodiment can be employed. That is, the I-regulator may simultaneously assume a storing function within the digitally operating modulation member. This is effected, according to still another feature of the invention, by having the output signal of the three-point amplifier control a stepping device through a gate circuit, and having the regulated system controlled through an exponentially imaging digital-analog converter connected to the outputs of the stepping device. In this manner there occurs, so to say, a multiple utilization of the storing elements with which the I-regulator and the digital-analog converter are to be provided.

Referring now to FIG. 3, there is shown an example of a loop organization according to the invention in which the regulated system 4 comprises not only a disturbance member 1 having a multiplicative influence $V_1$, but also a proportional or time-constant member 5 of any desired finite amplification. The characteristic feature of this regulated system 4 is the fact that the factorially acting disturbance member 1 is inseparably integrated into the system and consequently affects the regulated output signal $x$. The input of the regulated (forward-path) system is preceded by an exponentially modulating member 2 and is followed by a logarithmically modulating member 3. The regulated quantity $x$ is thus subjected to logarithmic modulation, converting it to the pilot magnitude $x' = {}^b\log x$. The datum or pattern quantity $x_w$ is likewise deformed with the aid of a corresponding, logarithmic modulating member 6 and is compared at a mixing point (comparator) 6' with the pilot magnitude $x'$. Consequently, the formation of the regulating departure $\Delta$ is not effected between the magnitudes $x_w$ and $x$ but rather between the logarithms of these two magnitudes. This is without significance to the regulating results because, at coincidence of the logarithms of $x$ and $x_w$, these values themselves are equal to each other. The regulating departure $\Delta$ is supplied to a regulating amplifier 7, for example an I-regulator, whose output magnitude $y$ is connected to the input of the modulator 2.

The portion of the regulating system located between the points 8 and 9 can be looked upon, in analogy to the principle represented in FIG. 2b, as being a proportional member with a constant amplification $1na/1nb$ determined by the bases of the respective exponential and logarithmic modulations. The output magnitude of the proportional member 8–9 is additively superimposed upon a value which depends upon the logarithm of the variable or unknown magnitude $V = V_1 \cdot V_2$. Consequently, the regulator 7 can be rated, in consideration of this defined and constant amplification gain, in accordance with an optimizing rule; and the regulated system then remains dynamically optimized under all expectable fluctuations of system operation and independently of variations in amplification of the disturbance quantity V.

The feedback control system shown in FIG. 4 is largely similar to that of FIG. 3, except that the members 6 and 3 of FIG. 3 are substituted by a divider device 10, and that only one logarithmic modulator 11 is used. This modification takes into account that the difference of two logarithmic values is equal to the logarithm of their quotient. The modification is of advantage in cases where it is difficult to secure for members 6 and 3 under all operating conditions the identical characteristics required for a precise regulating comparison, if purely analog-type modulators are employed in conjunction with drift-affected direct-current amplifiers.

When the switching contact bridges 12 and 13 (FIG. 4) are placed into vertical positions, the modulating member 11 is switched off and a three-point amplifier 14 is switched into the regulating system, whereafter the system operates on the principle of intermittent, three-point regulation. While usually the trigger and output voltages of a three-point flip-flop amplifier are symmetrical to the null point, the flip-flop amplifier used according to the invention exhibits a dependence of its output magnitude A upon the course of the input magnitude E as represented by the coordinate diagram shown as function on the block symbol 14. That is, the two finite (positive and negative) values of the output voltage that differ from null, extend parallel and symmetrical to the abscissa, whereas the appertaining trigger voltages $E_1$ and $E_2$ of the flip-flop amplifier on both sides of the null passage are located at the value 1 of a fictitious logarithmic characteristic denoted by L and are reciprocably related to each other so that $E_1 = 1/E_2$. The three-point flip-flop amplifier thus virtually represents an image of the logarithmic characteristic required for the purpose of the invention, by reproducing only three singular points (plus-off-minus) of this characteristic.

Figure 5:
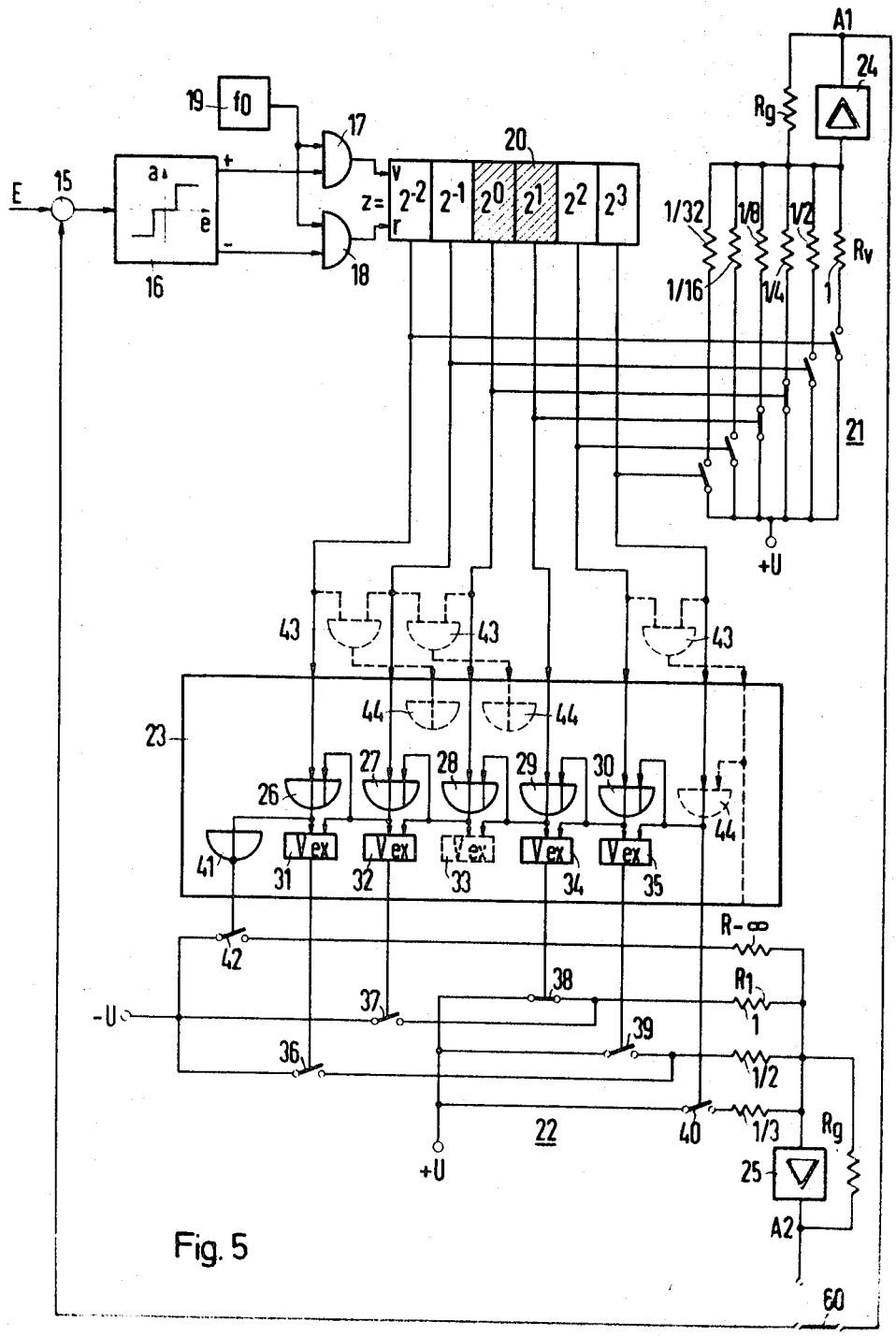
FIG. 5 is a logic circuit diagram of a modulating device for selective logarithmic or exponential modulation of the signal on a digital basis in a system according to FIGS. 3 or 4.

FIG. 5 shows by way of example an embodiment of a modulator on digital principles which is capable of selectively operating logarithmically or exponentially and is applicable as a modulator member at any of the places denoted by 2, 3, 6 or 11 in FIGS. 2a, 3 and 4.

In principle, the device of FIG. 5 constitutes an integral control system (I-regulator) in which the output magnitude of an integrator faries in dependence upon an input difference until there obtains precise coincidence between the input magnitude and the feedback magnitude derived from the output of the integration device. The input magnitude E to be modulated, constituted for example by a corresponding electrical current, is supplied through a difference-forming member 15 in the input circuit of a symmetrical three-point flip-flop amplifier 16. This amplifier furnishes at its (+)-output a signal when the input magnitude differs from null and is positive, and the (−)-output furnishes a signal when the input magnitude differs from null but is negative. The particular output signal thus occurring is supplied to an AND gate 17 or 1 which has a second input connected to a clock pulse generator 19 furnishing a pulse of constant frequency $f_0$. Depending upon which of the two outputs of the amplifier 16 supplies a signal, the pulses of the pulse generator 19 pass onto the forward input $v$ or the reverse input $r$ of a bi-directional binary counter 20. In the illustrated example the counter 20 has six steps of the indicated digit-positional weights $2^{-2}$ to $2^{-3}$. The individual step outputs of the counter 20 are directly connected with a digital-analog converter 21 and are indirectly connected with a second digital-analog converter 22 through a selector network 23 in which the signals occurring at the individual counter outputs act upon preferably electronic gate circuits. As schematically indicated in FIG. 5, these gate circuits incrementally vary the input impedance of negatively feedback connected direct-current amplifiers 24 and 25.

The input resistances of the direct-current amplifier 24, which is negatively feedback-coupled by means of a resistor $R_g$ and which, without the feedback, possesses a very high amplifying gain, are inversely proportional to the weights of the counter outputs correlated to the respective input resistances, and the resistances are graduated accordingly. Assume that generally the linear relation $A_1/U = k \cdot z$ between a number $z$ digitally contained in the counter 20, on the one hand, and an analog voltage $A_1$ at the output of the amplifier 24, on the other hand, is to be imaged, and also assume that U constitutes a constant voltage impressed upon the input of the digital-analog converter 21, whereas $k$ is an arbitrary proportionality factor. Under these conditions, the resistance $R_v$ correlated to the counter step of the lowest value is found to be expressed by the relation $R_v = R_g/k \cdot 2^{-2}$, since the amplification factor of the negatively feedback coupled direct-current amplifier 24 is proportional to the quotient of the negative feedback resistance to the particular input resistance effective at a time. In this manner, the digital-analog converter 21 can form a linear image of the instantaneous content of the binary counter 20. In the event the switch contact bridge 60 is in the illustrated horizontal position, the output magnitude $A_1$ of the digital-analog converter 21 is negatively feedback connected with the input. Consequently, the state of the counter 20 will vary until the input magnitude E and the output magnitude $A_1$ are equal.

A second digital-analog converter 22 is connected to the counter step outputs through another selector network 23. The selector network 23 serves to select from six available counter outputs the one signal-carrying output that has the highest digit weight at the time, and to then supply the voltage −U or +U to the input resistance which is coordinated to the selected output and appertains to a negatively feedback connected amplifier. For this purpose, the counter step outputs or taps are connected with respective inputs of OR gates 26 to 30. These OR gates permit a signal to appear at the respective outputs if a signal is applied to any one or more of the gate inputs. The second input of each of these OR gates is connected to the output of the OR gate next adjacent in the direction toward the higher counter step weight. When a signal appears at any one of the counter outputs, the OR gate connections just described have the effect that the same signal will appear at the output of all OR gates assigned to all counter steps of the lower weights. Mutually adjacent OR gates are connected in pairs with the inputs of antivalence circuits 31 to 35. An antivalence circuit is a gate arrangement with two inputs at whose output a signal will appear only if different logic signal conditions prevail at the two inputs. An embodiment of such an antivalence circuit, for example, is constituted by the so-called exclusive OR gate.

In the device according to FIG. 5, therefore, the appearance of a signal at one or several counter outputs will result in the occurrence of a signal at only the output of the exclusive OR gate ($V_{ex}$) that is assigned to the highest digit value of these signal-carrying counter outputs. For example, in the embodiment illustrated in FIG. 5, assume that, as indicated by hatching, the counter steps having the weights $2^1$ and $2^0$ carry an output signal at the moment under observation. The outputs of the exclusive OR gates 31, 32, 33, 34 and 35, as well as the output of the highest-weight counter step, actuate the gate circuits 36 to 40. Although these latter gates are shown for simplicity as mechanical devices, they are preferably designed as electronic or solid-state components and circuits. As a result of the actuation of gates 36 to 40, one of the input resistors of the electronic direct-current amplifier 25 is connected to the direct voltage −U or +U. The resistance of these input resistors are incrementally graduated in inverse proportion to the powers of the digit values of the counter 20. For example, assume that a logarithmic characteristic according to FIG. 5b according to the general equation $A_2/U = {}^b\log z$ is to be realized, in which equation the base of the logarithm is denoted by $b$. For example, on this assumption the value of the input resistance $R_1$ coordinated to the counter step having the weight $2^1$ or $2^{-1}$ is found to be $R_1 = R_g/{}^b\log 2$.

For approximating in practice the logarithm of the number null: $z = 2^{-\infty}$, at which none of the counter-step outputs would carry a signal, the device contains an inverter gate 41 which is connected to the output of the OR gate 26 and actuates a further switch 42, preferably also embodied by electronic or solid-state devices. The value of the resistance R−∞ which in this case conducts current, is kept as small as is still permitted by the dimensioning of the direct-voltage amplifier 25. With this particular operating condition, the output magnitude $A_2$ of the direct-voltage amplifier 25, as a rule, is located at its end or limit stop.

The output of the exclusive OR gate 33 in the selector circuit 23 would furnish a signal if the digital-analog converter 22 were required to form the logarithm of the number $2^0=1$. However, since this logarithm has the value null, the input circuit of the direct-voltage amplifier need not be impressed with a voltage. Hence, the exclusive OR gate, which here is illustrated only for exhibiting the systematic design principle in the interest of completeness, may also be omitted with this type of digital-analog converter 22.

The output magnitude $A_2$ of the digital-analog converter 22 varies in equal increments. This is due to the fact that only the logarithm of powers is formed whose exponents differ from each other by a unit value. If these steps are found to be still too large, the number of steps for a given counting volume of the counter can be increased in accordance with the supplementation shown in FIG. 5 by broken lines. For this purpose, AND gates 43 are connected to each two mutually adjacent counter-step outputs, and the outputs of the AND gates are connected in the illustrated manner to additional inputs of the selector network 23. These inputs are connected with additional OR gates 44 which are inserted in the illustrated manner between the OR gates 26 to 30. Furthermore, in analog supplementation of the above-described performance principle of the selector network 23, there are provided additional exclusive OR gates and coordinated electronic gate circuits and input resistances. In this manner, there is achieved a doubling of the output stages of the digital-analog converter 22 without changing the functioning in any other respect.

With the switching bridge 60 in the horizontal position shown in the right-hand corner of FIG. 5, the stationary condition of the binary counter is expressed by:

$$E = A_1 = k \cdot U \cdot z \text{ or } z = \frac{1}{k} \cdot \frac{E}{U}$$

hence $$A_2 = U \, {}^\mathrm{b}\!\log \frac{E}{k \cdot U}$$

By suitable choice of a high pulse-sequence frequency $f_0$ (see item 19 in FIG. 5), care is preferably taken to have this stationary condition reached as fast as feasible.

When the switching bridge 60 in FIG. 5 is placed into its vertical position, the output $A_2$ of the direct-current amplifier 25 is negatively feedback connected to the input of the three-point flip-flop amplifier 16. In the stationary condition of the binary counter 20 we now have the relation:

$$E = A_2 = U \, {}^\mathrm{b}\!\log z \text{ or } z = b^{\frac{E}{U}}$$

hence $$A_1 = k \cdot U \cdot b^{\frac{E}{U}}$$

The device shown in FIG. 5 thus affords effecting selectively a logarithmic or an evponential modulation of an input signal E.

Figure 6:
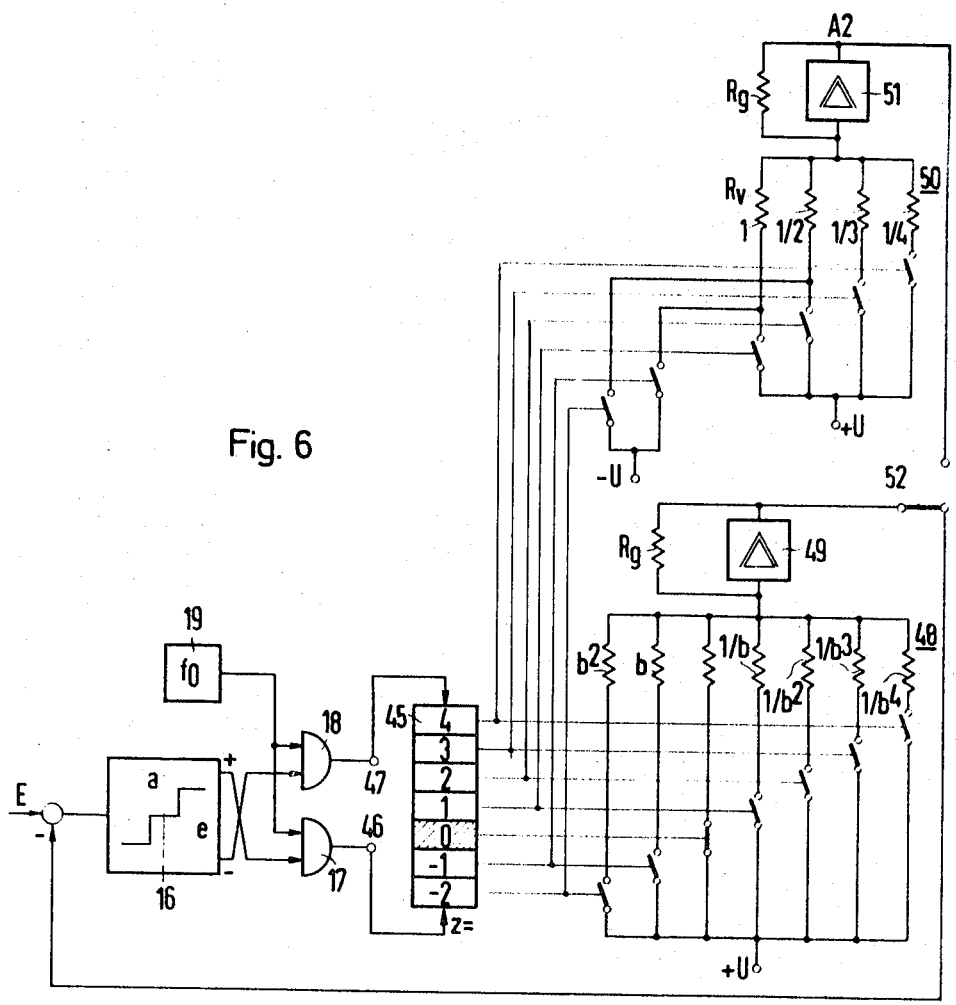
FIG. 6 is a logic circuit diagram of another embodiment of a digital modulator for exponential or logarithmic modulation of the signal in a system according to the invention.

FIG. 6 illustrates a different way of designing the modulation members to be employed according to the invention. The device also operates partially on a digital principle and involves a feedback closed-loop operation. Employed as integration means is a stepper 45 which may be constituted by a mechanical stepping switch but is preferably given an electronic or solid-state design, such as that of a shift register. In a shift register, only one of its end stages carries an output signal, and each input pulse causes shifting of this signal condition in one or the other direction, each time by one step to the next adjacent stage of the register. In the illustrated example the stage designated by null is hatched because this stage is supposed to carry the signal at the moment under observation. A pulse appearing at the input terminal 46 would shift this signal condition toward the right into the stage designated by 1. A pulse appearing at the other input terminal 47 would shift the signal to the left into the stage designated by $-1$.

Figure 6A:
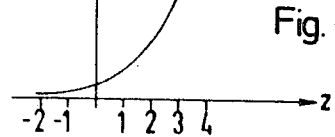
FIGS. 6a and 6b are graphs explanatory of the operation of the system shown in FIG. 6.
Figure 6B:
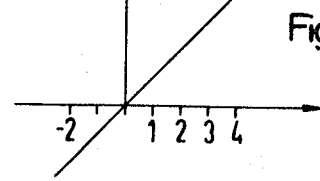
Figure 9:
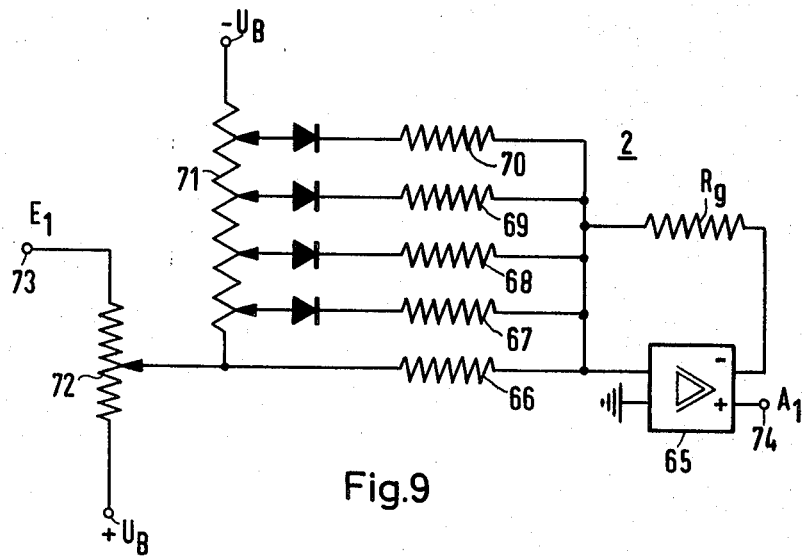
Figure 10:
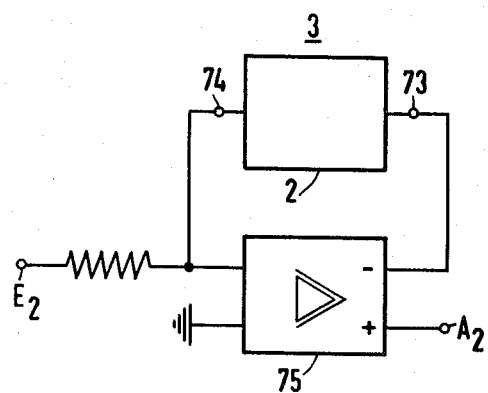

The shift pulses for the register 45 are taken from the outputs of respective AND gates 17 and 18 and are processed in analogy to the performance of the embodiment described with reference to FIG. 5. An exponentially imaging digital-analog converter 48 is connected to the outputs of the stepper 45. In principle, the converter 48 is similar to the above-described digital-analog converters, different therefrom only with respect to the graduation of its input resistances. If the numerical values ($z$) indicated in FIG. 6 are coordinated to the individual stages of the stepping device 45 and if, according to FIG. 6a, a characteristic according to the equation $A_1/U = b^z$ is to be realized, then the input resistance that for the amplifier 49 is coordinated to the stepper stage null, is found to have the same value as its negative feedback resistance $R_g$. The value for the other input resistances result as the product of the feedback resistance $R_g$ with the factors indicated on the drawing next to the respective symbols of these resistances. For linear imaging of the number $z$, there is provided a second digital-analog converter 50 which is likewise connected to the output of the stepper 45. The graduation of the input resistances is inversely proportional to the step weight of the corresponding coordinated stepper output. The resistance $R_v$ coordinated to the stage 1 or $-1$ possesses the value $R_v = R_g/k$ wherein $k$ denotes an arbitrarily selectable proportionality constant which determines the slope of the characteristic according to FIG. 6b.

When the switching bridge 52 is in the vertical position, the output magnitude $A_1$ of the direct-current amplifier 49 is negatively feedback connected to the input of the three-point flip-flop amplifier 16. In this condition and in the stationary state of the stepping device, there is:

$$E = A_1 = U \cdot b^z \text{ or } z = {}^\mathrm{b}\!\log \frac{E}{U}$$

hence $$A_2 = k \cdot U \cdot {}^\mathrm{b}\!\log \frac{E}{U}$$

However, when the switching bridge 52 in FIG. 5 is placed in the illustrated horizontal position, the output $A_2$ of the direct-current amplifier 51 is negatively feedback connected to the input of the flip-flop amplifier 16. Now, in the stationary state of the stepping device 45, there applies:

$$E = A_2 = k \cdot U \cdot z \text{ or } z = \frac{E}{k \cdot U}$$

hence $$A_1 = U \cdot b^{\frac{E}{k \cdot U}}$$

Consequently, the device illustrated in FIG. 6 is likewise suitable for logarithmic or exponential modulation of an electrical input magnitude E.

FIG. 7 shows circuit details of a device which fundamentally corresponds to FIG. 4 in the event the three-point flip-flop amplifier 14 of FIG. 4 is used and one and the same date storage device is to serve as regulator as well as a component of an exponentially modulating member 2. The datum (reference) value $x_w$ and the regulated (pilot) magnitude $x$ of the regulated system 4 are supplied to a divider device 10 whose output is connected to the input 53 of a three-point flip-flop amplifier 14 having symmetrical output voltages of respectively different polarities at mutually reciprocal input voltages of the same polarity. As mentioned above, in the range of small input voltages the three-point amplifier serves to incrementally form an image of a logarithmic characteristic L. The release of the forward switching pulses for a stepping switch or shift register 45 takes place in analogy to the performance described above with reference to FIG. 6; and the same applies to the exponential imaging by means of a digital-analog converter 48.

The performance of the system according to FIG. 7 is as follows: When the quotient of datum value $x_w$ and pilot value $x$ departs from unity, that is, when a regulating departure occurs, one of the AND gates 17 and 18 becomes conductive and passes the switching pulses to the stepper 45. Thereafter the output of the exponentially imaging digital-analog converter 48 is shifted either in one or the opposite direction until there obtains coincidence between datum value and pilot value, i.e. until the regulating aim is attained. This simplified system, despite its relatively simple organization, preserves the advantages afforded by the invention.

FIG. 8 illustrates an example of circuit details relating to the three-point amplifier 14 according to FIG. 7 (or FIG. 4). The amplifier is composed of two electronic amplifiers 54 and 55 which have positive feedbacks acting through respective resistors $R_m$ in order to assume the desired trigger or flip-flop characteristic. Each of the flip-flop amplifiers is provided with a constant negative bias voltage taken from taps of a potentiometer 56 which is energized from a constant negative direct voltage $-U_1$, the taps being connected with the amplifier inputs through respective resistors 57 and 58. The bias has the effect that the input magnitude supplied through the input terminal 53 must first compensate the effect of the bias voltage before a negative signal can appear at the outputs of the respective amplifiers 54 and 55. The output terminals of the amplifier are denoted by (+) and (−). The negative signal appearing at the output terminals is hereinafter designated as L signal. A null signal or a positive signal is hereinafter called NULL signal. If the input signal applied to terminal 53, starting from a negative value, is reduced in the direction toward the null value, the outputs of the amplifiers 54 and 55 both exhibit a positive signal. Consequently the terminal designated by (−) shows an L signal due to the presence of the inverter gate 59; and the (+) terminal shows a NULL signal. The L signal would have the effect of causing the AND gates 17 and 18 in FIG. 7 to conduct. When a given positive value, determined by the chosen position of the potentiometer tap at 57, is reached by the input magnitude applied to terminal 53, the output signal of amplifier 54 will jump from positive to negative values and thus the signal state at the (−) terminal will change from L signal to NULL signal. When a second value of the input at terminal 53 is exceeded, this value being likewise positive and defined by the chosen position of the potentiometer tap at 58, the output signal of the amplifier 55 assumes a negative value which corresponds to occurrence of an L signal at the (+) terminal.

In this manner a three-point characteristic can be secured in accordance with the characteristic entered on block 14 in FIG. 7. In a corresponding manner there can be obtained a device of a null-point symmetrical three-point flip-flop amplifier as employed in the devices according to FIGS. 5 and 6 where such an amplifier is denoted by 16. This only requires feeding the potentiometer 56 according to FIG. 8 with a null-point symmetrical voltage so that the tap at 57 furnishes a small positive bias voltage and the potentiometer tap 58 furnishes a negative bias voltage of the same magnitude, whereby the response threshold $E_1$ of the flip-flop amplifier 14 can be shifted into the negative range.

As mentioned above, simple logarithmic and exponential modulators as used at the localities denoted by 2, 3, 6 and 11 in FIGS. 2a to 4 are well known as such. However, one of these known ways of providing an exponentially modulating function generator as designated by 2 in FIG. 2a will now be described by way of example with reference to FIG. 9.

The function generator shown in FIG. 9 is equipped with biased threshold diodes. A differential amplifier 65 has a negative feedback which contains a resistor $R_g$.

The input circuit of the amplifier 65 contains a number of resistors 66 to 70 in parallel relation to each other. Each of the resistors 67 to 70 is connected in series with a diode to one of the respective taps of a potentiometer 71 connected to a negative direct voltage $-U_B$. When the potential of a fixedly adjusted tap of a further potentiometer 72 moves from zero potential or reference potential in the positive direction, the individual threshold diodes, previously biased by the negative voltage $-U_B$, become sequentially conducting so that the resistors 67 to 70 are successively connected in parallel to the input resistance 66. Consequently, the amplifying gain of the amplifier 65, which gain generally depends upon the quotient of the negative feedback resistance $R_g$ and the instantaneously effective input resistance, is progressively increased. The potentiometer 72 is connected to a positive direct voltage, for example likewise of the amount $U_B$. If an input voltage $E_1$ is impressed upon the terminal 73, the output terminal 74 of the amplifier 65 will exhibit an output voltage $A_1$ which possesses fundamentally the function represented on the block symbol of the function generator 2 in FIG. 2a. That is, the value of the output voltage $A_1$ as a function of the input voltage $E_1$ is in sufficient approximation similar to the desired function.

Figure 10:
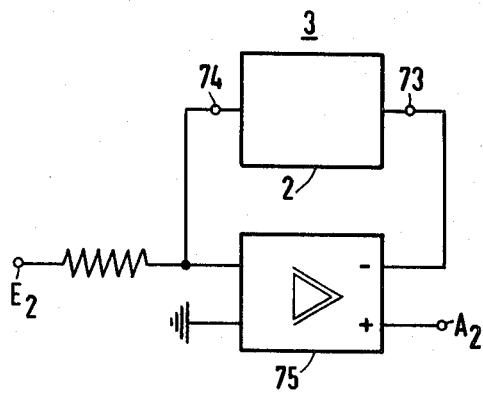
FIG. 10 is a circuit diagram of a function generator for logarithmic modulation of the signal, this device being also applicable in any one of the systems shown in FIGS. 2a, 3 and 4.

FIG. 10 illustrates schematically a corresponding circuit diagram of a logarithmically modulating function generator as designated by 3 in FIG. 2a and FIG. 3. This device is likewise equipped with purely analog components and incorporates the device denoted by 2 in FIG. 9. Use is made of the fact that the logarithmic function is inverse to an exponential function so that the above-described device 2 according to FIG. 9 need only be placed into the negative feedback of the differential amplifier 75. The biased threshold diodes are then connected in the feedback circuit of the amplifier 75; and the curve of output magnitude $A_2$ versus input magnitude $E_2$ corresponds in principle to the characteristic illustrated on the block symbol of the function generator 3 in FIG. 2a.

To those skilled in the art it will be apparent from a study of this disclosure that my invention permits of a great variety of modifications with respect to applicable components and circuitry, and hence may be given embodiments other than particularly illustrated and described herein, without departing from the essential features of my invention and within the scope of the claims annexed hereto.

I claim:

1. The method for maintaining substatnially constant regulating amplification in a closed-loop control system having a regulated component system and a regulating component system with a multiplicative disturbance input of spurious finite amplification in the regulated system, which method comprises the steps of imposing upon the regulating system an exponential signal modulation ahead of the disturbance input seen in the signal flow direction, and imposing a logarithmic modulation upon the disturbance-affected signal behind the disturbance input.

2. The method according to claim 1 which comprises giving the exponent and the logarithm of said modulations respectively different bases.

3. The method according to claim 1 which comprises forming an error signal as the difference between the lobarithm of a datum value and the logarithm of the quantity to be regulated, supplying the regulating system with the error signal, and controlling the regulated system in exponential dependence upon the output signal of the regulating portion.

4. The method according to claim 1 which comprises forming an error signal proportional to the logarithm of the quotient of a datum value to the quantity to be regulated, supplying the regulating system with the error signal, and controlling the regulated system in exponential dependence upon the output signal of the regulating portion.

5. A closed-loop control system having a regulated component system and a regulating component system with a multiplicative disturbance member of spurious finite amplification in the regulated system, in combination with apparatus for maintaining substantially constant regulating amplification, said apparatus comprising exponential modulator means disposed in said regulating system ahead of said disturbance member for imposing upon said regulating system an exponential signal modulation ahead of the disturbance input relative to the signal flow direction, and logarithmic modulator means following said disturbance member in said regulating system for imposing a logarithmic modulation upon the disturbance-affected signal behind the disturbance input.

6. In a control system according to claim 5, said modulator means being substantially constituted by a function generator comprising parallel connected circuits of which each has a threshold diode and a resistor in series with each other.

7. In a control system according to claim 5, said modulator means being substantially constituted by a function generator comprising an electronic modulation amplifier having an input circuit and a feedback circuit, and diodes of approximately logarithmic characteristic connected in at least one of said circuits.

8. In a control system according to claim 5, said exponential modulator means comprising a symmetrical three-point flip-flop amplifier having a signal input and having selectively active outputs, a reversible digital stepper, a clock-pulse controlled gate network connecting said stepper to said amplifier for shifting said stepper in a selected direction depending upon which of said amplifier outputs is active at a time, said stepper having respective step outputs, a non-linearly imaging digital-analog converter and a linearly imaging digital-analog converter which are both connected to said step outputs, one of said converters having an output feedback-connected to said signal input of said three-point amplifier.

9. In a control system according to claim 8, said non-linearly imaging digital-analog converter having a substantially exponential conversion characteristic.

10. In a control system according to claim 8, said non-linearly imaging digital-analog converter having a substantially logarithmic conversion characteristic.

11. A control system according to claim 8, comprising a selector network connected to said step outputs of said reversible digital stepper for continuously ascertaining the step output of the highest instantaneous digit-positional weight.

12. In a control system according to claim 11, said selector network comprising OR-gates of which each has an output and has one input connected to one of said respective step outputs and another input connected to the output of the OR-gate next adjacent in the direction toward the higher digit-positional weight, and antivalence circuits of which each has two inputs connected to the respective outputs of one of the respective pairs of mutually adjacent ones of said OR-gates.

13. In a control system according to claim 12, said selector network comprising AND-gates of which each has an output and has two inputs connected to mutually adjacent ones of said step outputs of said digital stepper, additional OR-gates having inputs connected between said antivalence circuits and said outputs of said respective AND-gates.

14. A control system according to claim 5 for discontinuous regulation, comprising a divider device having means for supplying a datum quantity and means for supplying a pilot quantity indicative of the regulated quantity, said divider device having an output and having at said output a signal indicative of the regulating departure, a three-point flip-flop amplifier having two outputs with symmetrically different output voltages of respectively different polarities at mutually reciprocal and equipolar input voltages, said divider output being connected to said amplifier, an integration member connected to the amplifier outputs, and said exponentially active modulator means being connected to said integration member to be controlled thereby.

15. A control system according to claim 14, comprising a clock-pulse controlled gate network, a reversible digital stepper connected through said gate network to said amplifier outputs to be shifted in a selected direction depending upon which of said amplifier outputs is active at a time, said stepper having step outputs, and an exponentially imaging digital analog converter connected between said step outputs and said regulated system.

16. In a control system according to claim 14, said three-point flip-flop amplifier comprising two electronic amplifiers having respective positive feedback circuits, bias voltage supply means connected to said two amplifiers for providing them with different constant bias voltages of the same polarities, a clock-pulse generator, two AND-gates connected to said pulse generator and to the outputs of said respective two amplifiers, and an inverter serially interposed between one of said AND-gates and the one of said two amplifiers.

References Cited
UNITED STATES PATENTS 3,483,475    12/1969    Mitchell _____ 328—145

JOHN S. HEYMAN, Primary Examiner

B. P. DAVIS, Assistant Examiner

U.S. Cl. X.R.

307—229; 328—98, 142